Figure 1:
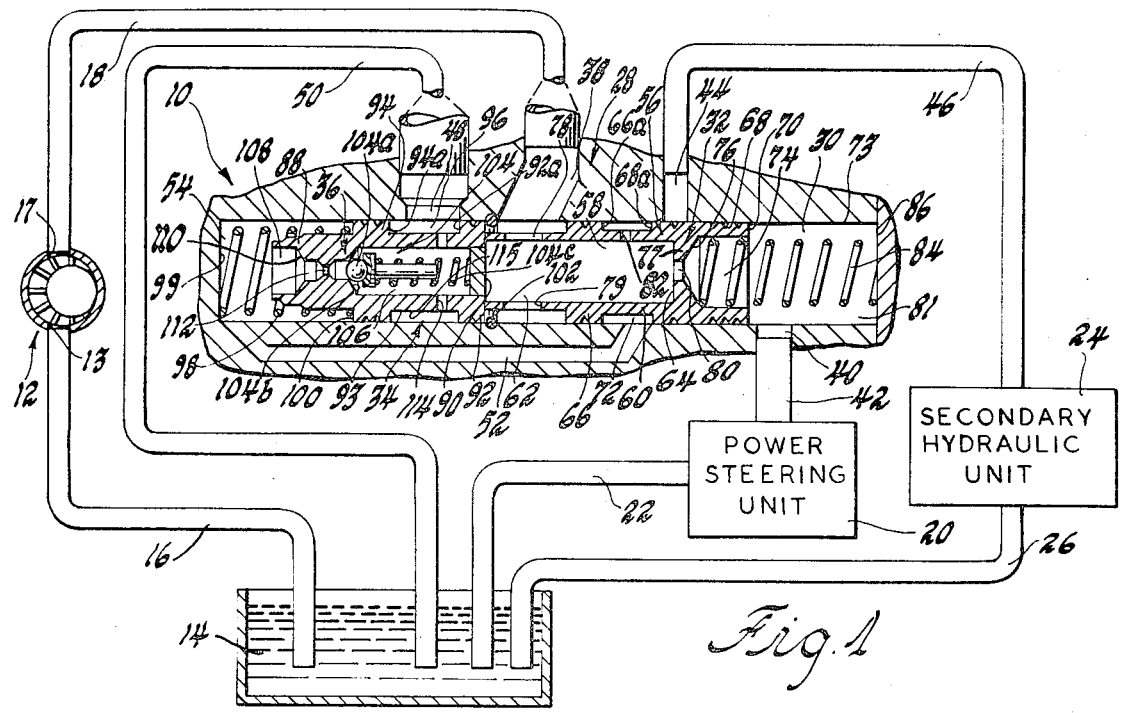

_United States Patent_ [15] 3,703,186

Brewer [45] Nov. 21, 1972

[54] FLOW DIVIDER CONTROL VALVE ASSEMBLY

[72] Inventor: Lee M. Brewer, Saginaw, Mich.

[73] Assignee: General Motors Corporation, Detroit, Mich.

[22] Filed: Aug. 12, 1971

[21] Appl. No.: 171,166

[52] U.S. Cl. .................137/101, 137/115, 137/118, 91/412
[51] Int. Cl. ..............................................G05d 15/00
[58] Field of Search......137/101, 102, 109, 115, 118, 137/116, 119, 116.5; 91/412

[56] References Cited

UNITED STATES PATENTS

| 2,793,498 | 5/1957 | Banker | 137/115 |
| 2,859,762 | 11/1958 | Banker | 137/115 |
| 3,165,113 | 1/1965 | Schultz | 137/101 |
| 3,628,558 | 12/1971 | Bahl | 137/118 |

Primary Examiner—Alan Cohan
Assistant Examiner—William H. Wright
Attorney—W. E. Finken et al.

[57] ABSTRACT

In a preferred form, this disclosure relates to a flow divider control valve assembly for controlling the flow of a fluid from a variable fluid pressure and supply source and which has a flow divider valve means with a first flow control orifice permanently operatively connecting an inlet port with a first or priority outlet port and a second flow control orifice operatively connected with the inlet port. The flow divider valve means is shiftable in response to a predetermined pressure drop across the first flow control orifice to limit the flow out the first outlet port to a predetermined rate by diverting the excess fluid to a second outlet port via the second flow control orifice. An operating valve means which is operatively connected with the inlet port and with the second flow control orifice at its downstream side is shiftable in response to a predetermined pressure drop across the second flow control orifice to limit the flow out the second outlet port to a second predetermined rate by allowing the excess fluid supply to pass out an exhaust port.

4 Claims, 8 Drawing Figures

INVENTOR.
Lee M. Brewer
BY
W. A. Schuetz
ATTORNEY

PATENTED NOV 21 1972
3,703,186
SHEET 2 OF 2
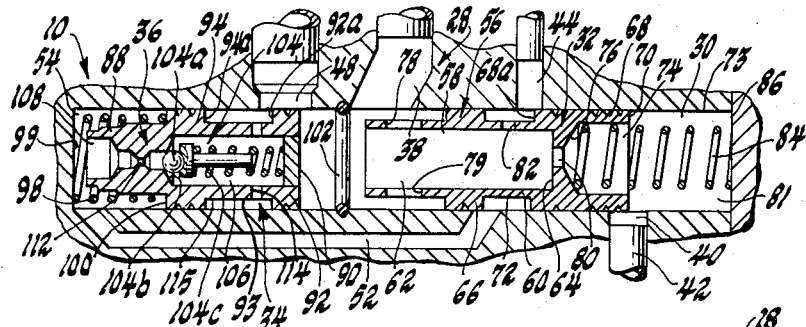
Fig. 4
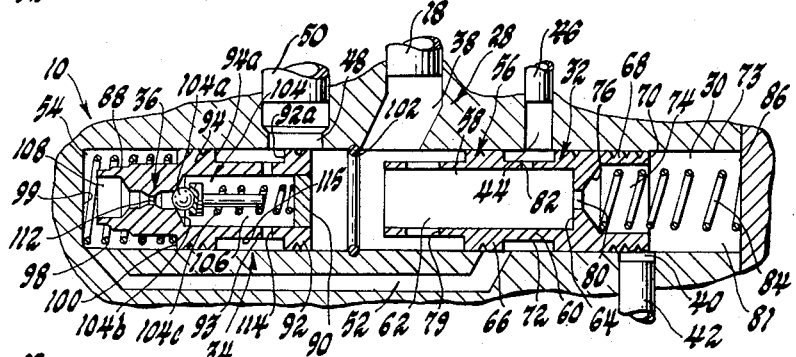
Fig. 4a
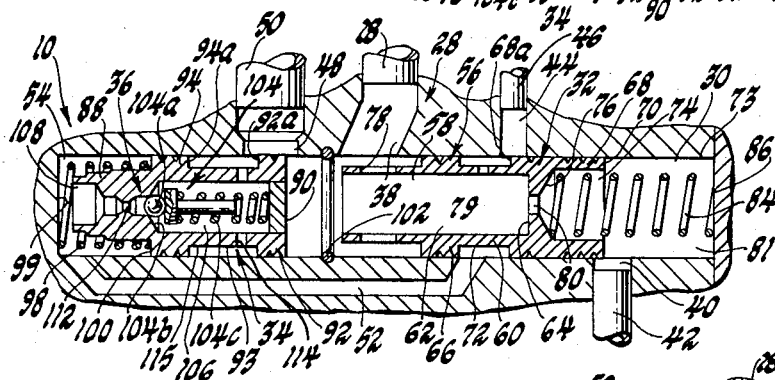
Fig. 4b
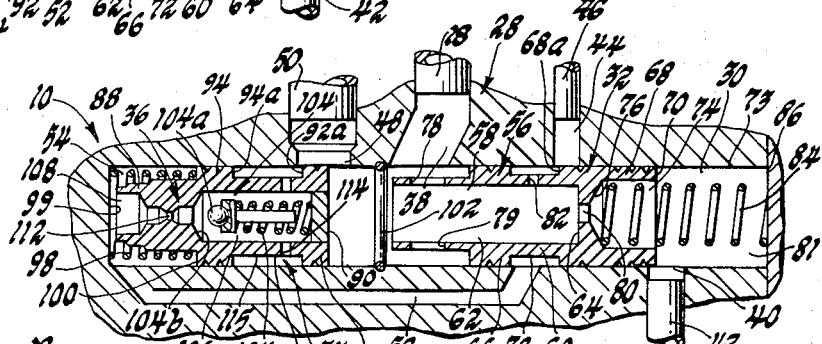
Fig. 5
Fig. 6
INVENTOR.
Lee M. Brewer
BY
W.A. Schmetz
ATTORNEY

FLOW DIVIDER CONTROL VALVE ASSEMBLY

The present invention relates to a flow divider control valve assembly, and more particularly to a flow divider control valve assembly for controlling the flow of a fluid from a variable fluid pressure and supply source to priority and secondary hydraulic systems.

Flow divider valve assemblies having flow divider valve elements with a flow control orifice controlling communication between an inlet port and a priority outlet port and wherein the flow divider valve element is shiftable in response to a predetermined pressure drop across the flow control orifice to restrict the flow out the priority outlet port to a predetermined rate and to divert the excess fluid flow out a secondary outlet port have heretofore been provided. See, for example, U.S. Pat. No. 2,737,196. Flow divider valve assemblies similar to the aforementioned and with pressure relief means to provide a maximum limit on the overall system pressure which can occur upon an external restriction of the priority outlet port or the secondary outlet port have also heretofore been provided. See, for example, U.S. Pat. No. 2,859,762. Further, control valve assemblies have also been provided wherein communication between an inlet port and an outlet port to a hydraulic mechanism has been controlled by a flow control orifice and wherein a shiftable operating valve element is responsive to a predetermined pressure drop across the flow control orifice when the fluid flow exceeds that required to maintain a predetermined flow rate to communicate an exhaust port with the inlet port and exhaust the excess fluid supply. The aforementioned control valve assemblies were also provided with a maximum system pressure relief means in the operating valve element which was responsive to external restrictions in the system on the downstream side of the flow control orifice to allow the operating valve element to shift and communicate the exhaust port with the inlet port to limit the system pressure to a maximum predetermined value. See, for example, U.S. Pat. No. 3,367,354.

An object of the present invention is to provide a new and improved flow divider control valve assembly for controlling the flow of fluid from a variable fluid pressure and supply source wherein an inlet port is in fluid communication with the variable fluid pressure and supply source, and wherein the valve assembly includes first and second spaced outlets ports and an exhaust port in fluid communication with the variable fluid pressure and supply source, a flow divider valve means having a first flow control orifice permanently operatively connecting the inlet port with the first outlet port and a second flow control orifice permanently operatively connected with the inlet port and which is shiftable in response to a predetermined pressure drop across the first flow control orifice to limit the flow rate out the first outlet port to a predetermined rate by diverting the fluid supply in excess of that required to maintain the predetermined flow rate to the second outlet port via the second flow control orifice, and an operating valve means which is operatively connected with the inlet port and the second flow control orifice at its downstream side and is responsive to a predetermined pressure drop across the second flow control orifice for limiting the flow rate out the second outlet port to a second predetermined rate by allowing the fluid supply in excess of that required to maintain the second predetermined flow rate to be exhausted out the exhaust port.

Another object of the present invention is to provide a flow divider control valve assembly, as described in the preceding object, and wherein a pressure relief means is operatively connected with the exhaust port and wherein the downstream side of the second flow control orifice is responsive to a maximum predetermined pressure in the hydraulic systems connected to the valve assembly for providing a pressure drop across the operating valve means to move the same to open the exhaust port and allow excess fluid supply to be exhausted.

Accordingly, these and other objects of the present invention are accomplished, in a preferred embodiment, by providing a flow divider control valve assembly for controlling the flow of fluid from a variable fluid pressure and supply source to first and second hydraulic systems. The valve assembly includes a valve body having an inlet port in communication with the variable fluid pressure and supply source, spaced priority and secondary outlet ports, an exhaust port; and a first valve member having first and second flow control orifices permanently in communication with the inlet port and with the first flow control orifice in constant communication with the priority outlet and where the valve member is biased toward a first position in which it blocks communication between the second flow control orifice and the secondary outlet. The valve member is shiftable relative to the valve body from its first position to unblock communication between the second flow control orifice and the secondary outlet port in response to a predetermined pressure drop across the first flow control orifice. The valve assembly further includes a second valve member operatively connected with the inlet port and the downstream side of the second flow control orifice and which is biased toward a normal position in which it blocks communication between the inlet port and the exhaust port. The second valve member is shiftable to communicate the inlet port with the exhaust port in response to a predetermined pressure drop across the second flow control orifice. The second valve member also has a pressure relief means which is operatively connected with the exhaust port and the downstream side of the second flow control orifice and which is responsive to a maximum predetermined pressure in either the first or second hydraulic systems for providing a pressure drop across the second valve member for the second valve member to move in response thereto to open the exhaust port and allow the excess fluid flow to be exhausted.

These and other objects of the present invention will become more fully apparent from the following description and drawings wherein:

FIG. 1 is a schematic view of a hydraulic system embodying the novel flow divider control valve assembly of the present invention therein; and FIGS. 2, 3, 4, 4a, 4b, 5, and 6 are fragmentary views of the hydraulic system shown in FIG. 1 and which show different parts of the flow divider control valve assembly of the present invention in different positions.

As representing the preferred embodiment of the present invention, the drawing shows the flow divider control valve assembly 10 in fluid communication with a suitable or conventional pump 12, herein shown as a vane type pump such as would be driven from the engine of an automotive vehicle. The pump 12 has its inlet port 13 in fluid communication with a fluid supply 14, such as oil, via a line 16 to thereby draw a supply of fluid by suction from the fluid supply 14 into the body of the pump 12 and provide a fluid flow out its outlet port 17 into a line 18. The flow divider control valve assembly 10 is further shown to be in fluid communication with a first hydraulically operated unit 20, herein shown as a power steering unit such as would be utilized in an automotive vehicle. The power steering unit 20 has its outlet in fluid communication via a line 22 with the fluid supply 14. The valve assembly 10 is also in communication with a secondary hydraulically operated unit 24 whose outlet is in fluid communication with the fluid supply 14 via a line 26.

The flow divider control valve assembly 10 broadly comprises a valve body 28 with a cylindrical bore 30 therein, a flow divider valve means 32 for communicating all of the fluid flow from the pump 12 to the power steering unit 20 until a first predetermined flow rate is attained and thereafter directing the excess fluid flow to the secondary hydraulic unit 24, operating valve means 34 for limiting the flow rate to the secondary hydraulic unit 24 to a second predetermined value and thereafter exhausting the excess fluid supply, and a pressure relief valve means 36 for initiating operation of the operating valve means.

Referring to FIG. 1, the valve body 28 of the flow divider control valve assembly 10 is shown as having an inlet port 38 which is in communication with the bore 30 approximately at the midpoint of the overall length of the bore 30. The inlet 38 is in fluid communication with the pump outlet 17 via the line 18 and receives the fluid flow from the pump 17 to communicate the fluid flow with the bore 30 of the valve body 28. The valve body 28 is also shown as having a first or priority outlet port 40 which is axially spaced to the right of the inlet port 38 and which is operatively connected via a line 42 for fluid communication with the power steering unit 20. The valve body 28 also has a secondary outlet port 44 which is axially spaced between the priority outlet port 40 and the inlet port 38. The outlet port 44 is operatively connected via a line 46 for fluid communication with the secondary hydraulic unit 24. The valve body 28 additionally includes an exhaust port 48 which is axially spaced to the left of the inlet port 38, as shown in FIG. 1, and which is operatively connected via a line 50 for fluid communication with the fluid supply 14. A flow restriction passage 52 is also provided in the valve body 28 and is shown as having one end in communication with the bore 30 at a position diametrically opposite the secondary outlet port 44 and at an axial position adjacent to, but to the left of the secondary outlet port 44, as shown in FIG. 1. The flow restriction passage 52 has its other end in communication with the bore 30 at a position adjacent one end 54 of the bore 30.

The flow divider valve means 32 comprises a first valve member 56 which is slidably supported within the bore 30 for axial movement and which has an axially extending, cylindrical first chamber or opening 58 defined by an annular side wall 60. The inner chamber 58 has an open end 62 at the lefthand end of the valve member 56, as shown in FIG. 1, and terminates at its other end in a first reaction surface 64. The valve member 56 has a first annular land 66 which projects radially outwardly from the side wall 60 of the valve member 56 and slidably and sealingly engages the wall of the bore 30. The land 66 is axially positioned at approximately the midpoint of the length of the inner chamber 58. The valve member 56 also includes a second annular land 68 which extends axially from one end 70 of the valve element 56 toward the first land 66 and which projects radially outwardly from the side wall 60 of the valve element 56 to slidably and sealingly engage the wall of the bore 30. The facing sides 66a and 68a of the first and second lands 66 and 68 define an annular cavity or recess 72 between the side wall 60 of the valve element 56 and the wall 73 of the bore 30.

The valve element 56 has a second axially extending chamber or opening 74 having one end 70 in communication with the bore 30 and terminating at its other end in a second reaction surface 76 which is opposed to the first reaction surface 64. The reaction surfaces 76 and 64 are defined by a radially extending wall 77 located intermediate the ends of the valve element 56. A pair of diametrically opposed openings 78 and 79 extend through the side wall 60 to communicate the fluid flow received by the inlet port 38 and the bore 30 from the pump 17 to the first chamber 58. A first flow control orifice 80 extends in an axial direction through the wall 77 of the valve member 56 to communicate the fluid flow from the first chamber 58 to the second chamber 74 and the chamber 81 defined by the bore 30 on the righthand side of the valve member 56, as shown in FIG. 1. A second flow control orifice 82 extends through the wall 60 to communicate the fluid flow from the first chamber 58 to the peripheral cavity 72.

The valve member 56 is biased to a normal position in which the second land 68 completely uncovers the priority outlet port 40 and completely blocks the secondary outlet port 44 by a compression spring 84. The compression spring 84 has one end in abutting engagement with the second reaction surface 76 and its other end in abutting engagement with an end wall 86 of the valve body 28. It is significant that the first and second flow control orifices 80 and 82 are in a parallel relationship with each other rather than a series relationship because, as is well known to those skilled in the art, the overall pressure drop across the valve assembly 10 and the operating pressure range of the fluid flow at the inlet port 38 will be lower. It should be appreciated that the lower the pressure of a hydraulic system the easier it is to cool the fluid and less horsepower is required from the drive means to supply the fluid flow.

The operating valve means 34 comprises a second annular valve member 88 which is slidably supported within the bore 30 for axial movement and which has its right end, as shown in FIG. 1, serving as a first reaction surface 90. The second valve member 88 has a first land 92 adjacent its right end which extends radially outwardly from its side wall 93 to slidably and sealingly engage the wall 73 of the bore 30. A second land 94 similar to the first 92 is positioned axially at approximately the midpoint of the length of the valve member 88. The facing sides 92a and 94a of the first and second lands 92 and 94 define a sealed cavity or annular recess 96 between the side wall 93 of the valve member 88 and the wall 73 of the bore 30. The recess 96 is permanently in communication with the exhaust port 48.

The second valve member 88 is biased to a normal position under no flow conditions in which the first land 92 blocks communication between the inlet port 38 and the exhaust port 48 by a compression spring 98. The compression spring has one end in abutting engagement with an end wall 99 of the valve body 28 and its other end in abutting engagement with the land 94. The land 94 at its left side defines a second reaction surface 100. In its normal position, the valve member 88 is biased by the compression spring 98 into abutting engagement with an annular stop ring 102 carried by the valve body 28 and which is located in a concentric relationship with the bore 30 and axially positioned between the inlet port 38 and the exhaust port 48.

The pressure relief means 36 generally comprises a ball check valve assembly 104 which is located within a relief chamber 106 in the interior of the second valve member 88. The ball check valve assembly 104 includes a ball 104a which is normally biased into engagement with a tapered surface 104b on the valve member 88 at the left end of the chamber 106 by a compression spring 104c which has one end in abutting engagement with the ball 104a and its other end in abutting engagement with the valve member 88 at the right end of the chamber 106. The pressure relief means also includes an axially extending, cylindrical chamber 108 at the left end of the valve member 88 which terminates in a third reaction surface 110. The valve member has an axially extending restricted flow valve port 112 for communicating the chamber 108 with the chamber 106. The pressure relief means 36 further includes a pair of diametrically opposed ports 114 which extend through the side wall 115 for constantly communicating the relief chamber 106 with the sealed cavity 96.

As was previously stated, under no-flow conditions when the pump 17 is not being driven, the first valve member 56 is biased by the compression spring 84 to a normal position, as shown in FIG. 1, in which the second land 68 blocks the secondary outlet port 44 but does not block the first priority outlet port 40, and the second valve member 88 is biased by the compression spring 98 to a normal position where the first land 92 blocks communication between the inlet port 38 and the exhaust port 48.

Figure 2:
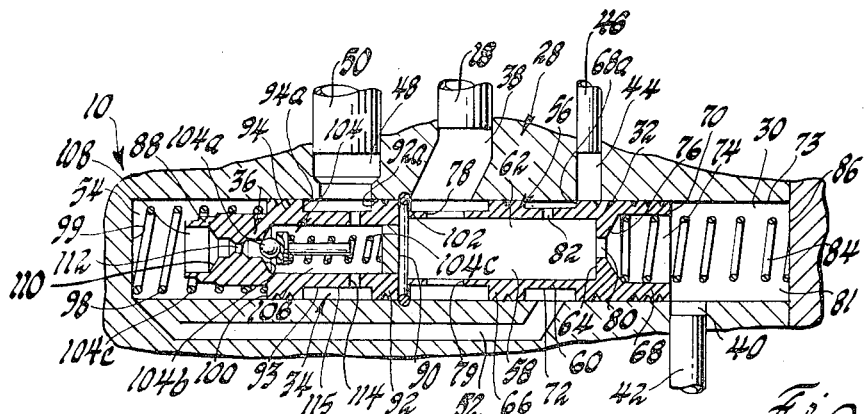

When the pump 17 is driven at a low speed within a low speed range of speeds, such as under idling conditions of an engine for an automotive vehicle, the resulting fluid flow is communicated from the inlet port 38 through the two openings 78 in the first valve member 56 to the first chamber 58. The fluid flow then passes through the first flow control orifice 80, into the second chamber 74, and thence into the bore 30 and out the priority outlet port 40 to the power steering gear unit 20. A pressure drop across the first flow control orifice 80 results by virtue of the restriction of the fluid flow, as is well known to those skilled in the art. Referring to FIG. 2, the effect of the resulting pressure drop is a resultant force upon the total left end projected area of valve member 56 including the reaction surface 64 in opposition to the bias of the compression spring 84 acting upon the reaction surface 76. As the speed of the pump 17 is increased within the low speed range of speeds, the pressure of the fluid in chamber 58 increases. As the pressure in chamber 58 increases above a predetermined value the first valve member is shifted to the right toward a position as shown in FIG. 2. Further movement of the valve member 56 toward the right would result in land 68 partially blocking the first priority outlet port 40 and partially unblocking the secondary outlet port 44. The compression spring 84 has a linear displacement characteristic or spring coefficient which results in the valve member being shifted to the above-described position, as shown in FIG. 2, when the flow rate out the first priority outlet port 40 reaches a predetermined maximum rate.

As the speed of the pump 17 increases past the low speed range to a higher speed range of speeds, the resultant force from the pressure differential across the first flow control orifice 80 shifts the first valve element 56 further rightward, and the first land begins to partially block the first priority outlet port 40 to restrict the fluid flow thereout, but still maintain the predetermined maximum flow rate out the first priority outlet port 40. Simultaneously, the first land 68 begins to uncover the secondary outlet port 44 and thus, a portion of the fluid supply is also directed from the first chamber 58, through the second flow control orifice 82 and cavity 72 into the secondary outlet port 44. The first valve element 56 continues to move rightward in response to increases in the fluid flow rate resulting from increases in the speed of the pump 17 within the higher speed range of speeds of the pump 17, and thereby the first land 68 is caused to gradually block more of the first priority outlet port 40 and increase the restriction of the fluid flow into the first priority outlet port 40 to maintain the predetermined maximum flow rate. Simultaneously, the first land 68 is also caused to gradually uncover more of the secondary outlet port 44 to reduce the restriction of the fluid flow out the secondary outlet port 44 thereby directing the remaining fluid supply over that required to maintain the predetermined maximum flow rate out the first priority outlet port 40 into the secondary outlet port 44. Consequently, the fluid flow rate out the secondary outlet port increases as the restriction of the secondary outlet port 44 is reduced as the valve member moves toward the right.

Figure 3:
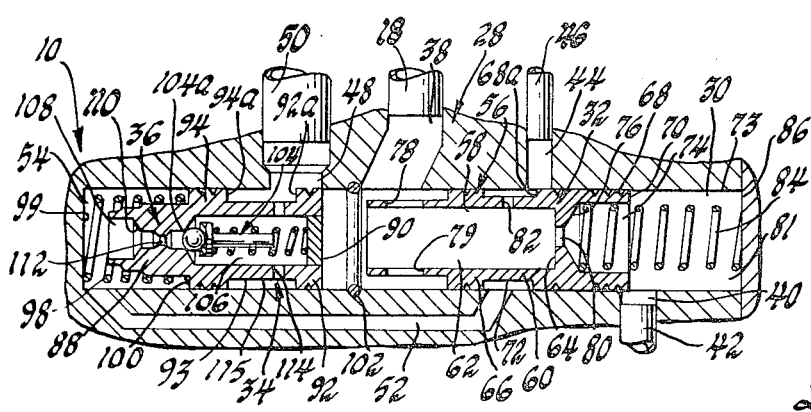

Because the first reaction surface 90 of the second valve element 88 is immediately adjacent the open end 62 of the first chamber 58 and the inlet port 38, the pressure of the fluid flow on the upstream side of the second flow control orifice 82 acts thereupon in opposition to the bias of the compression spring 98 upon the second reaction surface 100. Further, the pressure of the fluid flow on the downstream side of the second flow control orifice 82 is communicated from the cavity 72 to the left side of the second valve element 88 to act thereupon in concert with the compression spring 98 and in opposition to the pressure on the upstream side of the second flow control orifice 82 acting upon the first reaction surface 90. In this manner, a pressure drop equal to the pressure drop across the second flow control orifice 82 occurs across the second valve element 88. As the speed of the pump 17 increases through the higher speed range, the pressure differential across the second flow control orifice 82 and the second valve member 88 increases. As the pressure drop approaches a predetermined maximum value, which will occur when the flow rate to the secondary unit reaches its predetermined maximum, the valve element 88 is shifted toward the left against the bias of the compression spring 98 and from its normal position, as shown in FIG. 2. The compression spring 98 has a linear displacement characteristic or spring coefficient such that the second valve member 88 is shifted to a position where further movement would result in the first land 92 unblocking the exhaust port 48, as shown in FIG. 3, when the speed of the pump 17 reaches the optimum value in the higher speed range. When the speed of the pump 17 reaches the optimum value in the higher speed range and the second valve member 88 has been shifted to the aforementioned position, the first valve element 56 has been shifted to the position shown in FIG. 3 where the predetermined maximum flow rate out the first priority outlet port 40 is maintained and the second land 68 has sufficiently unblocked the secondary outlet port 44 so that a predetermined maximum flow rate out the secondary outlet port has been reached.

When the speed of the pump 17 increases into the highest speed range, the fluid flow rate increases to above that required to maintain the predetermined maximum flow rates out the first priority outlet port 40 and the secondary outlet port 44. When this occurs, the pressure drop across the second valve member 88 increases sufficiently for the resultant forces acting thereon to move the second valve member 88 further leftward and thereby unblock the exhaust port 48 to exhaust any excess fluid flow back to the fluid supply 14 via line 50, as shown in FIG. 4. The restriction of the exhaust port 48 by the second valve member 88 is varied in response to variations in the speed of the pump 17 within the highest speed range to allow for only the fluid flow in excess of that required to maintain the predetermined maximum flow rates out the priority and secondary outlet ports 40 and 44 to be exhausted.

It should be understood that the aforementioned conditions, as shown in FIG. 4, continue to exist while the speed of the pump 17 is maintained in the predetermined highest speed range and as long as the power steering system 20 and the secondary hydraulic system 24 are not in use. When the power steering and/or the secondary hydraulic systems 20 and 24 are used, the fluid flow to those systems 20 and 24 is restricted which results in what is hereinafter called an external restriction of the priority outlet port 40 and/or the secondary outlet port 44. It should also be understood that external restriction of either the first priority outlet port 40 or the secondary outlet port 44 without compensating means within the valve assembly 10 could result in an increase in pressure within the entire hydraulic system above a desired limit. The compensating means of the valve assembly 10 which prevents an increase in pressure within the entire hydraulic system above a desired or maximum design limit will now be described.

Under the conditions described above and with the valve assembly 10 in the position shown in FIG. 4, when an external restriction is placed upon the secondary outlet port 44, the pressure of the fluid flow on the downstream side of the second flow control orifice 82 is increased. Thus, the pressure drop across orifice 82 decreases and the fluid pressure on the upstream side of orifices 80 and 82 increases. If the external restriction of port 44 is not sufficient to raise the fluid pressure on the downstream side of orifice 82 to a predetermined value, the increase of fluid pressure on the upstream side of orifice 80 merely shifts the first valve member 56 to the right, as shown in FIG. 4a. The shifting of the valve member 56 decreases the restriction of the fluid flow out the secondary outlet port 44 and maintains the predetermined maximum flow rate. Similarly, the restriction of the fluid flow out the first priority outlet port 40 is increased and the predetermined maximum flow rate is maintained.

When the external restriction placed upon the secondary outlet port 44 is sufficient to raise the fluid pressure on the downstream side of the second flow control orifice 82 to the predetermined maximum pressure, the ball type check valve 104 of the pressure relief means 36 is opened by virtue of its communication via the flow restriction passage 52 with the cavity 72 on the downstream side of the second flow control orifice 82. A fluid flow is thereby allowed to enter the pressure relief chamber 106 and pass through ports 114 to pass out the exhaust port 48. By relieving the fluid pressure on the downstream side of the second flow control orifice 82, the pressure differential across the second flow control orifice 82 and the second valve member 88 is increased, and the resultant forces acting on the second valve member 88 shift the same to the left, as shown in FIG. 6. This serves to increase the amount of fluid flow exhausted out exhaust port 48 and limits pressure on the upstream side of the first and second flow control orifices 80 and 82 to limit the fluid pressure in the entire hydraulic system to the predetermined maximum value.

When an external restriction is placed on the priority outlet port 40 which does not raise the fluid pressure on the downstream side of the first flow control orifice 80 to the predetermined maximum value, the pressure drop across the first flow control orifice 80 is decreased and the fluid pressure on the upstream side of the first control orifice 80 increases, as is understood by those skilled in the art. The decrease in the resultant force from the decrease in the pressure drop allows the first valve member 56 to be shifted leftward by the compression spring 84, as shown in FIG. 4b, which decreases the restriction of the fluid flow out the priority outlet port 40 to maintain the predetermined maximum flow rate. The increase in the fluid pressure on the upstream sides of the first and second flow control orifices 80 and 82 increases the pressure differential across the second flow control orifice 82 and the second valve member 88. The increase in the pressure differential across the second flow control orifice 82 would normally result in the flow rate out the secondary outlet port 44 increasing to above the predetermined maximum, however, the leftward movement of the first valve member 56 increases the restriction of the fluid flow out the secondary outlet port and thereby maintains the predetermined flow rate.

If the external restriction placed upon the first priority outlet port 40 is sufficient to raise the fluid pressure on the downstream side of the first flow control orifice 80 to the predetermined maximum value, the pressure drop across the first flow control orifice 80 is significantly decreased and the fluid pressure on the upstream side of the first and second flow control orifices 80 and 82 is increased. The significant decrease in the resultant force from the decrease in the pressure drop across the first flow control orifice 80 provides for the compression spring 84 to shift the first valve member 56 leftward to decrease the restriction of the fluid flow out the first priority outlet port 40 and increase the restriction of the fluid flow out the secondary outlet port 44, as shown in FIG. 5. The increase in the fluid pressure on the upstream side of the second flow control orifice 82 results in a significant increase in the pressure drop across the second flow control orifice 82 and when the fluid pressure on the downstream side of the second flow control orifice 82 increases to the predetermined maximum value, the ball type valve member 104 opens to increase the pressure drop across the second valve member 88, as previously described. The second valve member 88 is thereby shifted further to the left, as shown in FIG. 5, to increase the fluid flow exhausted which limits the fluid pressure in the entire hydraulic system to the predetermined maximum value.

The foregoing disclosure relates to only one embodiment of the invention which may be modified within the scope of the appended claims.

What is claimed is:

1. A flow divider control valve assembly for controlling the flow of a fluid from a variable fluid pressure and supply source, comprising: an inlet port in fluid communication with the variable fluid pressure and supply source; first and second spaced outlet ports, and an exhaust port in fluid communication with said variable fluid pressure and supply source; flow divider valve means having a first flow control orifice permanently operatively connecting said inlet port with said first outlet port and a second flow control orifice permanently operatively connected with said inlet port, said flow divider valve means being shiftable in response to a predetermined pressure drop across said first flow control orifice to limit the flow rate out said first outlet port to a predetermined rate by diverting the fluid supply in excess of that required to maintain said predetermined flow rate to said second outlet port via said second flow control orifice; and operating valve means operatively connected with said inlet port and with the second flow control orifice at its downstream side and being shiftable in response to a predetermined pressure drop across said second flow control orifice to limit the flow rate out said second outlet port to a second predetermined rate by allowing the fluid supply in excess of that required to maintain said second predetermined flow rate to be exhausted out said exhaust port.

2. A flow divider control valve assembly for controlling the flow of fluid from a variable fluid pressure and supply source comprising: a valve body having an inlet port in communication with the variable fluid pressure and supply source, first priority and secondary spaced outlet ports and an exhaust port; a first valve member having first and second flow control orifices permanently in communication with said inlet port, said first control orifice also being in constant communication with said first priority outlet port, said first valve member being biased toward a first position in which it blocks communication between said second flow control orifice and said secondary outlet port, said first valve member being shiftable relative to the valve body from its first position to unblock communication between said second flow control orifice and said secondary outlet port in response to a predetermined pressure drop occurring across the first flow control orifice, a second valve member separate from but axially aligned with said first valve member and which is biased toward a normal position in which it blocks communication between said inlet port and said exhaust port, said second valve member being shiftable to communicate the inlet port with the exhaust port in response to a predetermined pressure drop occurring across the second flow control orifice.

3. A flow divider control valve assembly for controlling a supply from a variable fluid pressure and supply source to first and second hydraulic units, comprising: an inlet port in fluid communication with the variable fluid pressure and supply source; first and second outlet ports in fluid communication with the hydraulic system; an exhaust port in fluid communication with said variable fluid pressure and supply source; flow divider valve means including a first flow control orifice operatively connecting said inlet port with said first outlet port and a second flow control orifice operatively connected with said inlet port for delivering all available fluid supply at said inlet port in a low fluid supply pressure range to said first outlet port and blocking said second outlet port to prevent delivery of said fluid supply via said second flow control orifice to said second outlet port, said flow divider valve means in a higher fluid supply pressure range being responsive to predetermined pressure drops across said first flow control orifice for gradually restricting said first outlet port to prevent a flow rate out said first outlet port in excess of a predetermined rate and for gradually opening said second outlet port to deliver the resulting excess fluid supply to said second outlet port via said second flow control orifice; operating valve means operatively connected with said inlet port and with the downstream side of said second flow control orifice for blocking said exhaust port in low and higher fluid supply pressure ranges to deliver all of said fluid supply to said first and second outlet ports, said operating valve means in a high fluid supply pressure range being responsive to predetermined pressure drops across said second flow control orifice for gradually opening said exhaust port to allow the excess of said fluid supply over that required to maintain said predetermined flow rate out said second outlet port to exhaust out said exhaust port; and pressure relief means operatively connected with said exhaust port and with said downstream side of said second flow control orifice and being responsive to a predetermined pressure on the downstream side of either of said first or second control orifices to exhaust some of the fluid flow and create a pressure drop across said operating valve means to cause the same to be shifted to open said exhaust port and allow excess fluid supply to be exhausted.

4. A flow divider control valve for controlling a fluid supply from a constant displacement pump operating at varying speeds and receiving fluid on an intake side from a fluid reservoir and discharging the fluid under pressure on a discharge side to a power steering control valve and a secondary hydraulic unit comprising: a valve body having a bore in fluid communication with the discharge side of the constant displacement pump via an inlet port, a first outlet port in fluid communication with the power steering control valve, a second outlet port in fluid communication with the secondary hydraulic unit and axially spaced from said first outlet port, and an exhaust port in fluid communication with the intake side of the constant displacement pump; a flow divider valve member slidably mounted within said valve body and having a chamber with one end thereof in fluid communication with said inlet port, said flow divider valve member having a first reaction surface at the other end of said chamber and an opposite second reaction surface, a first flow control orifice through said first and second reaction surfaces and a second flow control orifice through the wall of said chamber, biasing means acting upon said second reaction surface for urging said flow divider valve member in a low fluid supply pressure range to open said first outlet port and to block said second outlet port to deliver all available fluid supply at said inlet port via said first flow control orifice to said first outlet port, said flow divider valve member being responsive in a higher fluid supply pressure range to predetermined pressure drops across said first flow control orifice to move against said biasing means to gradually restrict said first outlet port to prevent a flow rate out said first outlet port in excess of a predetermined rate and to gradually open said second outlet port to deliver the resulting excess of said fluid supply to said second outlet port via said second flow control orifice; an operating valve member slidably mounted within said valve body and having first and second opposed reaction surfaces, said first reaction surface being in fluid communication with said inlet port, flow restriction means for communicating said second reaction surface with the downstream side of said second flow control orifice, biasing means acting upon said second reaction surface for urging said operating valve member in said low and high fluid supply pressure ranges to block said exhaust port to deliver all of said fluid supply to said first and second outlet ports, said operating valve member being responsive in a high fluid supply pressure range to a predetermined pressure drop across said second flow control orifice to move against said biasing means and to open said exhaust port to allow the excess of said fluid supply over that required to maintain a predetermined flow rate out said second outlet port to be exhausted out said exhaust port; and a pressure relief valve comprising a relief chamber in said operating valve member in fluid communication with said exhaust port and a pressure relief valve member in fluid communication with said flow restriction means, said pressure relief valve member being mounted within said relief chamber and being operable to open said relief chamber when the pressure in the power steering control valve and the secondary hydraulic system exceeds a maximum predetermined value for relieving pressure on the downstream side of said second flow control orifice whereby said pressure relief valve provides a pressure drop across said operating valve member for said operating valve member to move in response thereto and against said biasing means to open said exhaust port to exhaust excess fluid supply and limit the pressure in the power steering control valve and the secondary hydraulic system to said maximum predetermined value.

* * * * *